Feb. 27, 1962 W. H. MULLIN 3,022,647
AIR CONDITIONING
Filed Dec. 20, 1960 2 Sheets-Sheet 1
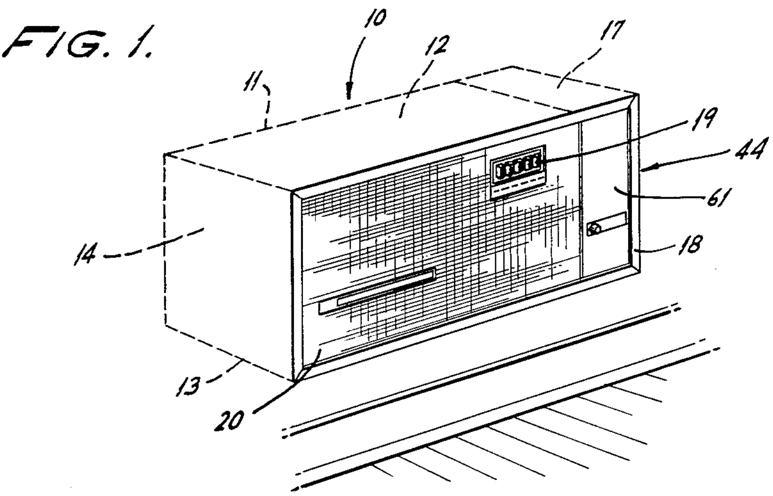
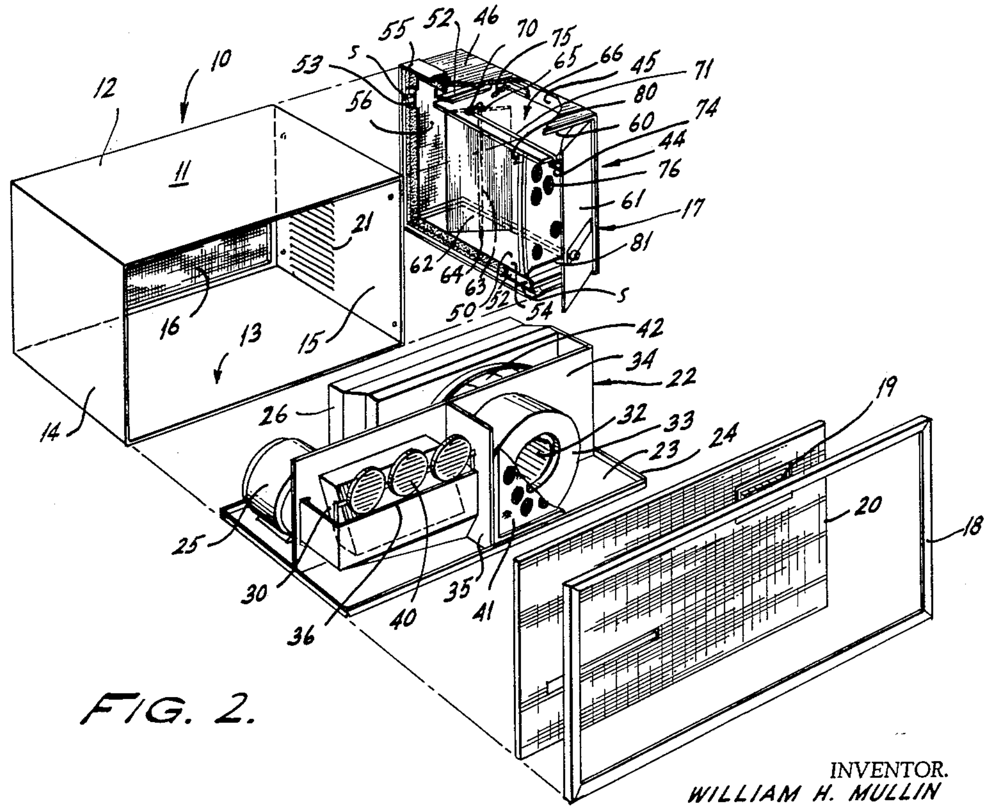
INVENTOR.
*WILLIAM H. MULLIN*
BY
*Harry W. Hargis III*
AGENT Feb. 27, 1962 W. H. MULLIN 3,022,647

AIR CONDITIONING

Filed Dec. 20, 1960 2 Sheets-Sheet 2

INVENTOR.
WILLIAM H. MULLIN

BY
Harry W. Hargis III

AGENT

3,022,647
AIR CONDITIONING

William H. Mullin, Havertown, Pa., assignor, by mesne assignments, to Philco Corporation, Philadelphia, Pa., a corporation of Delaware Filed Dec. 20, 1960, Ser. No. 77,149
8 Claims. (Cl. 62—427)

This invention relates to air conditioning and is especially concerned with air conditioning apparatus of a compact and unitary type characterized by its versatility of construction and operation.

The need for especially designed ventilating structure has long been known in the construction of apartment buildings, offices, and other multiple occupancy units due to the lack of natural cross ventilation arising from use of adjoining walls and the placement of individual habitable units on all four sides of a building. Air conditioning apparatus of the so-called "room-cooler" type installed in buildings of this type often have solved this ventilating problem, but at times some installations have left much to be desired in providing sufficient quantities of fresh, filtered outside air quickly to rid a room of stale, smoke and odor laden air.

It is therefore a primary object of the invention to provide compact and unitary air conditioning apparatus adapted to overcome the above described difficulties.

It is another object of the invention to provide unitary, separately handleable air vent means adapted for installation in novel and compact cooperative arrangement with a room-cooler type air conditioner.

It is a specific objective of the invention to provide simple and effective means for enhancing the efficiency as well as versatility of operation of a room cooler.

It is still another object of the invention to provide a novel so-called "through-the-wall" installation for a room cooler.

In the achievement of the foregoing and other objectives, the invention contemplates the combination of a room cooler having an outdoor condenser air flow circuit and an indoor evaporator air flow circuit with separately handleable unitary air duct means adapted for such novel cooperative disposition with said room cooler as selectively to convey a portion of the outdoor air flowing through the condenser air circuit into the indoor space being conditioned, and in such close proximity to an inlet air opening of the evaporator air flow circuit as to be drawn into such opening, whereby the said outdoor air is mixed with and discharged into the room air being conditioned.

The manner in which the foregoing and other objects and advantages may best be achieved will be understood from a consideration of the ensuing description taken in light of the accompanying drawing, in which:

FIGURE 1 is a perspective showing of air conditioning apparatus embodying the invention;

FIGURE 2 is an exploded view, in perspective, of apparatus seen in FIGURE 1 and illustrating features of the invention;

Figure 3:
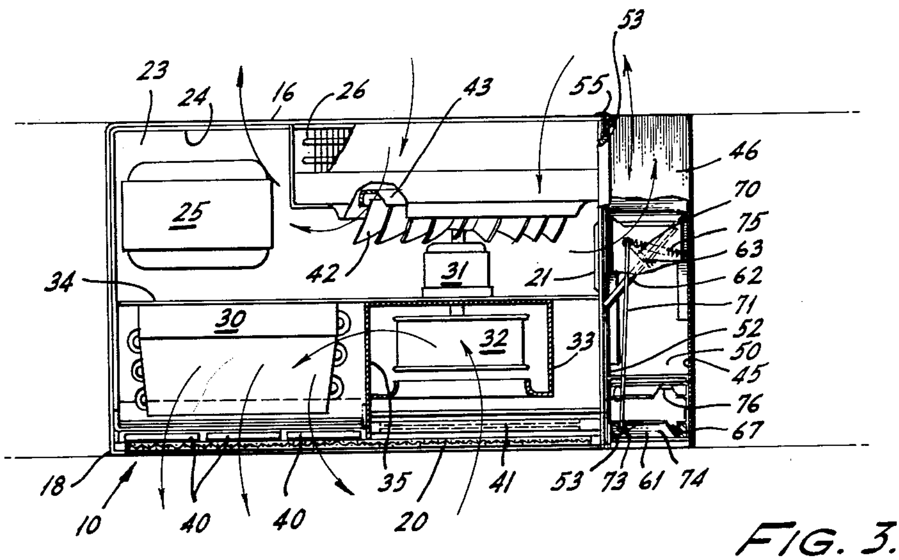
FIGURE 3 is a somewhat diagrammatic plan view, partly in section and with parts broken away, of apparatus seen in FIGURE 1 and showing both structural and operational features of the invention.

Referring again, with more particularity, to the drawing, there is seen in FIGURE 1 an air conditioner 10 of the room cooler type disposed in a through-the-wall installation. With reference also to FIGURE 2, the air conditioner includes a sleeve type housing 11 having respective top and bottom walls 12 and 13, left and right hand walls 14 and 15. The rear outdoor opening of housing 11 is spanned by a protective grill 16, whereas the front or indoor opening is covered by a decorative grill 20. Right hand wall 15 is provided with louvers 21, the function of which will be hereinafter more fully explained. A sleeve extension is seen at 17, which extension comprises the novel air vent means 44 of the present invention to be hereinafter more fully described. It will be noted that while extension 17 is of unitary, separately handleable construction, it is shown as being disposed cooperatively with housing 11 to form the through-the-wall sleeve. A decorative frame 18 overlies the front edge of the composite sleeve 11, 17.

Figure 4:
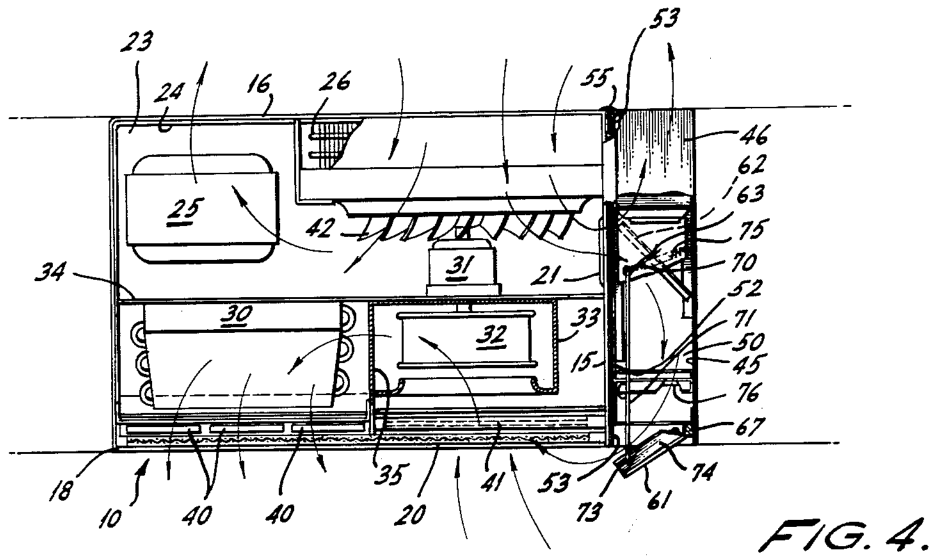
FIGURE 4 is similar to FIGURE 3 and shows an additional operational feature of the invention.

Unitary, separately handleable refrigerating means 22 for the air conditioner is supported upon a base pan 23 provided with an upturned peripheral portion 24, said pan 23 with means 22 being slidably receivable within housing 11 for mounting therein in the position shown in FIGURES 3 and 4. Means 22 includes a motor compressor 25, a condenser 26, an evaporator 30, and associated conduits (not shown) by which said compressor, condenser, and evaporator are connected in series flow circuit, as well as suitable control means therefor disposed in grill 20 and designated generally by the numeral 19.

Air moving means for the air conditioner includes a motor 31 (FIGURES 3 and 4) disposed within the condenser chamber and which rotatably supports a blower wheel 32 adapted to cause circulation of indoor air, or air inside an enclosure undergoing treatment, in heat exchange relation with evaporator 30. Blower wheel 32 is housed within a scroll structure 33 disposed adjacent a partition 34 which divides housing 11 into an evaporator chamber and the above mentioned condenser chamber. The portion of housing 11 comprising the condenser chamber is disposed and adapted for air flow communication with outdoor air, or air outside an enclosure undergoing treatment, whereas the portion of the cabinet comprising the evaporator chamber is disposed for air flow communication with indoor air, or air inside the enclosure to be conditioned. The evaporator chamber is subdivided by means of another partition 35 into a first section having disposed therein blower wheel 32 and scroll structure 33, and a second section in which is disposed evaporator 30. The mouth portion 36 of scroll structure 33 extends through partition 35 and into position to direct air against one face of evaporator 33 for flow therethrough and outwardly through rotatably adjustable discharge air louvers 40. A conventional filter 41 is disposed between the right hand side of grill and the inlet opening of scroll structure 33. The condenser chamber also has disposed therein the motor compressor 25 and a propeller type fan 42 rotatably supported by motor 31 normally to provide for drawing outdoor air through grill 16 (see FIGURE 3), over condenser 26 and for discharging a portion of the spent air over motor compressor 25 and outwardly through grill 16. Another portion of the spent air is discharged through louvers 21 in side wall 15, which air is utilized advantageously in the present invention. Fan 42 includes a conventional condensate ring 43 (FIGURE 3) disposed to dip into condensate within a sump (not shown) and, in accordance with known practice, adapted to impel the condensate onto relatively warm condenser 26 to be evaporated therefrom in the course of the refrigerating cycle. It will of course be understood that, in accordance with usual practice, by manipulating control means 19, the air moving means may be operated independently of the refrigerating means if it is desired only to circulate air within the enclosure.

In particular accordance with the invention, vent means 44 is disposed adjacent and forms a part of the composite through-the-wall sleeve including housing 11 and extension 17 thereof. Vent means 44 is comprised of a vertical side wall 45 parallel to and spaced from side wall 15 of housing 11 and having substantially the same dimensions as the latter wall, and respective top and bottom walls 46 and 50 aligned as shown with like walls 12 and 13 of housing 11. The left side of vent means 44 includes an opening 54 defined by flanges 52 extending along the edges of top wall 46 and bottom wall 50 and flange 53 interconnecting these same walls at the rear as shown. Flanges 52 and 53 are disposed and held by screws S against louvered wall 15 of housing 11 in such manner that the latter wall overlies opening 54 and closes the same except in the area of louvers 21. A gasket 55 seals vent means 44 to housing 11 in the region of adjacency of these elements. The rear wall of vent means 44 comprises a grill 56 disposed substantially in the plane of grill 16 of housing 11. The front of vent means has an opening 60 adapted to be opened and closed by a door 61 carried by hinge means 67 disposed along the outer edge of the door and mounted upon the corresponding vertical edge of the vent means. Door 61 is movable between the closed position seen in FIGURE 3 and the partially open position seen in FIGURE 4. The significance of which positions will hereinafter be more fully explained in relation to the invention.

A vertically extending damper 62 is pivotally mounted upon a pin 63 journalled for rotative movements at its lower end, as seen at 64, in bottom wall 50 and at its upper end, as seen at 65, in bracket means 66 spaced downwardly from top wall 46. Pin 63 includes a crank portion 70 disposed between bracket means 66 and top wall 46. Damper 62 is therefore pivotal between the illustrated positions (FIGURES 3 and 4) in response to rotation of crank portion 70. Means for rotating crank portion 70 comprises a rod 71 pivotally connected at 72 to the former, and pivotally connected at 73 to a flange 74 of vent door 61. An over-center spring 75 extends between bracket 66 and the end of crank portion 70 and is disposed and adapted resiliently to urge damper 62 to either of its positions. A filter 76 spans the cross section of vent means 44, is releasably held by respective upper and lower retainer means 80 and 81, and filters the vented air.

Importantly, it will be noted that in the closed position of vent door 61 (FIGURE 3) damper 62 is moved to the position shown wherein the opening afforded by the vent means is closed off from the indoor area both by the door and the damper, and outdoor air drawn through the condenser 26 by fan 42 is discharged to the outdoors through grill 16 and louvers 21 of housing 11. Air discharged through louvers 21 is deflected to the outdoors by damper 62 and the rear portion of the vent means, this air flowing to the outdoors through grill 56 of the vent means. Independently of the outdoor air circulation, indoor air is withdrawn from the room by the blower 32, forced through the evaporator chamber and returned to the indoor area undergoing treatment.

By opening the vent door 61, as seen in FIGURE 4, damper 62 is moved to a position in which a major portion of the open area of louvers 21 is disposed in air flow communication with the front portion of the vent means and the indoor region being conditioned. Any remaining portion of the open area of louvers 21 will remain in flow communication with the outdoor air as hereinabove described with respect to FIGURE 3. With additional reference to FIGURE 4, it is seen that the angular positioning of opened door 61 is so selected as to cause air impelled through opening 60 by condenser fan 42 to be directed into the enclosure undergoing treatment and thence into the path of indoor air being drawn into the evaporator chamber from the enclosure. This filtered outdoor air is thus positively and effectively mixed with the indoor air prior to discharge thereof into the enclosure. Mixing of the indoor and outdoor air in this manner may be carried out either with or without operation of the cooling means. Also, the vent means may be utilized advantageously in the absence of operation of both positive air circulation and the cooling means. It is important to note, therefore, that by positioning the door to direct outdoor air into the path of indoor circulating air no additional porting of the air conditioner housing is required to effect the positive air moving and mixing achieved by the vent means of the present invention.

It will be appreciated that vent means 44 enhances versatility of operation of an air conditioner by: (1) providing for either forced or natural ventilation of an enclosure undergoing treatment, when operation of the refrigeration means is not required, by opening vent door 61; (2) providing for dehumidification of an enclosure when the sensible heat load is small and the latent heat load is large by opening vent door 61 to permit entry into the enclosure of quantities of relatively warm, outdoor air in amounts sufficient to cause the unit to operate longer and more effectively to dehumidify the air as it is circulated over the evaporator and within the enclosure being conditioned; and (3) providing for maximum cooling by closing vent door 61 to effect recirculation of air within the enclosure.

It will be further appreciated that in the broader aspect of the invention the vent means 44 may be provided as an integral element with housing 11, or it may be provided as an accessory item adapted for attachment to an air conditioner having a housing and air moving means of the type illustrated, either prior to or after installation. Also it will be understood that use of the vent means is not limited to through-the-wall room cooler installations, for it may also be used in window-type room cooler installations. It is of course understood that the invention contemplates the foregoing, as well as such other modifications as may fall within the scope of the appended claims.

I claim:

1. For use with air conditioning apparatus of the type comprising a box-like housing having top, bottom and side walls, and open front and rear wall portions, an evaporator chamber in air flow communication with an enclosure to be treated and a condenser chamber in air flow communication with outdoor air, means for moving air through said chambers, and louver means provided in one of said side wall portions and communicating with said condenser chamber, air vent means comprising: a box-like member having top and bottom walls, a single side wall, and an open side wall adapted for disposing against the louvered side wall of such housing, said box-like member having open rear and front walls; a damper within said box-like member operative between a first position adapted to deflect air flowing through such louvers to the outdoors and a second position whereby air flowing through such louvers may be deflected to the enclosure undergoing treatment; a door hingedly mounted to said box-like member along the front edge of its side wall and adapted to open and close said front opening; and means for operatively coupling said door to said damper whereby the latter is moved to said first position when the door is moved to closed position and the damper is moved to said second position when the door is moved to open position, said door in the latter position being disposed and adapted to direct such outdoor air as it flows into the enclosure into the path of air flowing from said enclosure into such evaporator chamber.

2. Air conditioning apparatus comprising a box-like housing having top, bottom and side walls, and open front and rear wall portions; an evaporator chamber in air flow communication with an enclosure to be treated; a condenser chamber in air flow communication with outdoor air; means for moving outdoor air through said condenser chamber; means for moving air from within said enclosure through said evaporator chamber and back into said enclosure; opening means provided in one of said side wall portions and communicating with said condenser chamber; a box-like member having top and bottom walls, a single side wall, and an open side wall disposed against the side wall of said housing provided with opening means, said box-like member having open rear and front walls; a damper within said box-like member operative between a first position adapted to deflect air flowing through said wall opening means to the outdoors and a second position whereby air flowing through said opening means is deflected to the enclosure undergoing treatment; a door hingedly mounted to said box-like member along the front edge of its side wall and adapted to open and close said front opening; and means for operatively coupling said door to said damper whereby the latter is moved to said first position when the door is moved to closed position and the damper is moved to said second position when the door is moved to open position, said door in the latter position being disposed and adapted to direct outdoor air, as it flows into the enclosure, into the path of air flowing from said enclosure into said evaporator chamber.

3. Air conditioning apparatus comprising: wall means defining a housing; a condenser chamber within said housing in air flow communication with outdoor air; means for moving outdoor air through said condenser chamber; opening means provided in one of said wall means and communicating with said condenser chamber; a casing having an open wall overlying the wall means of said housing provided with opening means and in air flow communication therewith, said casing also including openings in air flow communication with both said outdoor air and said enclosure; means defining a damper within said casing operative between a first position adapted to deflect air flowing through said housing opening means to the outdoors through one of said casing openings, and a second position whereby air flowing through said housing opening means is deflected to the enclosure undergoing treatment through the other of said casing openings; means defining a door operative selectively to open and to close the other of said casing openings; and means for operatively coupling said door to said damper whereby the latter is moved to said first recited position, and the damper is moved to said second recited position, when the door is moved to open position, said door in the latter position being disposed and adapted to direct condenser chamber air into the enclosure.

4. Air conditioning apparatus comprising: wall means defining a housing; an evaporator chamber within said housing in air flow communication with an enclosure to be treated; a condenser chamber within said housing in air flow communication with outdoor air; means for moving outdoor air through said condenser chamber; means for moving air from within said enclosure through said evaporator chamber and back into said enclosure; opening means provided in one of said wall means and communicating with said condenser chamber; a casing having an open side wall overlying the wall means of said housing provided with opening means and in air flow communication therewith, said casing also including openings providing air flow communication with said outdoor air and said enclosure; means defining a damper within said casing operative between a first position adapted to deflect air flowing through said wall opening means to the outdoors through one of said casing openings and a second position whereby air flowing through said opening is deflected to the enclosure undergoing treatment through the other of said casing openings; means defining a door adapted to open and close the other of said casing openings; and means for operatively coupling said door to said damper whereby the latter is moved to said first position when the door is moved to closed position and the damper is moved to said second position when the door is moved to open position, said door in the latter position being disposed and adapted to direct outdoor air, as it flows into the enclosure from said other casing opening, into the path of air flowing from said enclosure into said evaporator chamber.

5. Air vent means for use with air conditioning apparatus of the type comprising walls defining a housing, an evaporator chamber within said housing and in air flow communication with an enclosure to be treated, a condenser chamber in said housing and in air flow communication with outdoor air, means for moving air through said chambers, and louver means provided within a wall portion of said housing and in air flow communication with said condenser chamber, said air vent means comprising: a casing including an open wall portion adapted to overlie the louver means of said housing, said casing having a pair of open walls confronting one another; means defining a damper within said casing operative between a first position adapted to deflect air flowing through such louver means to the outdoors and a second position whereby air flowing through such louver means may be deflected to the enclosure undergoing treatment; means defining a door mounted selectively to open and close one of said walls; and means for operatively coupling said door to said damper whereby the latter is moved to said first position when the door is moved to a closed position, said door in the latter position being disposed and adapted to direct such outdoor air as it flows into the enclosure into the path of air flowing from said enclosure into such evaporator chamber.

6. Air conditioning apparatus comprising: means defining a housing adapted to be mounted in an opening in the wall of an enclosure, said housing having a portion disposed in air flow communication with air outside said enclosure and another portion disposed in air flow communication with air inside said enclosure to be conditioned; means dividing said housing into an evaporator compartment, a condenser compartment, and a damper compartment, said damper compartment being disposed in air flow communication with said condenser compartment; means for circulating air through said compartments; means defining a pair of outlets for said damper compartment and disposed in air flow communication with the outside air and the inside air; damper means in said damper compartment for directing the flow of air selectively from said condenser compartment either to the inside air or to the outside air; a door disposed and adapted to open and close said damper outlet disposed in air flow communication with the inside air; and means for operatively coupling said door to said damper means whereby the latter is moved to a position for directing the flow of air from said condenser compartment to the outside air when the door is moved to closed position and for moving the damper means to said position for directing the flow of air from said condenser compartment directly to the inside air when the door is moved to open position, said door in its open position being operative to direct such air into the path of inside air flowing into the evaporator compartment.

7. Air conditioning apparatus comprising: means defining a housing adapted to be mounted in an opening in a wall of an enclosure; partition means for dividing said housing into evaporator, condenser, and damper chambers, said damper chamber being disposed in air flow communication with the condenser chamber; first air moving means for directing air outside said enclosure sequentially through said condenser chamber and into said damper chamber; second air moving means for directing air from within an enclosure being conditioned sequentially through said evaporator chamber and back into such enclosure; damper means associated with said damper chamber and adapted selectively to direct air being moved by said first air moving means from said damper chamber either into said enclosure and thence into the path of air being directed from said enclosure into said evaporator chamber or into the air outside said enclosure; and a door operatively coupled with said damper means and movable to a first position to close off said damper chamber from the enclosure when the damper means is positioned to direct air to the outside, said door being movable to a second position to open said damper chamber to said enclosure when said damper means is in its position for directing air into said enclosure.

8. Air conditioning apparatus for treating air within an enclosure, comprising: means defining a housing; partition means disposed and adapted to divide said housing into an evaporator chamber and a condenser chamber; first air moving means for directing air from outside said enclosure through said condenser chamber second air moving means for directing air from within said enclosure through said evaporator chamber and back into said enclosure; air vent means including damper means comprising a movable deflector disposed and adapted selectively to direct air being moved by said first air moving means either directly into said enclosure into the path of air being directed therefrom through said evaporator chamber, or directly back into the outdoor air; and a door operatively linked with said deflector, said door being operative to close said vent means when said deflector is positioned to effect air flow to the outdoors.

References Cited in the file of this patent

UNITED STATES PATENTS

| | | |
|---|---|---|
| 2,535,775 | Ashley | Dec. 26, 1950 |
| 2,959,036 | Mehalick | Nov. 8, 1960 |